Oct. 17, 1933.    A. W. PHELPS ET AL    1,931,009

WINDING MACHINE

Filed Nov. 19, 1930

Inventors
Alva W. Phelps
and James W. Campbell

By Spencer Hardman & Fehr
Their Attorneys

Patented Oct. 17, 1933

1,931,009

UNITED STATES PATENT OFFICE 1,931,009

WINDING MACHINE

Alva W. Phelps and James W. Campbell, Anderson, Ind., assignors to Delco-Remy Corporation, Anderson, Ind., a corporation of Delaware Application November 19, 1930
Serial No. 496,578

5 Claims. (Cl. 242—61)

This invention relates to apparatus for winding strips of relatively thin sheet material, for example, the thin strips of metal foil which separate strips of insulating paper used in manufacturing electrical condensers of the cylindrical type.

One of the objects of the present invention is to provide a machine having a rotatable arbor or mandrel upon which sheet material may be wound and means for collapsing the arbor so that the article wound upon it may be readily removed from the arbor.

Further objects and advantages of the present invention will be apparent from the following description, reference being had to the accompanying drawing, wherein a preferred embodiment of one form of the present invention is clearly shown.

Figure 1:
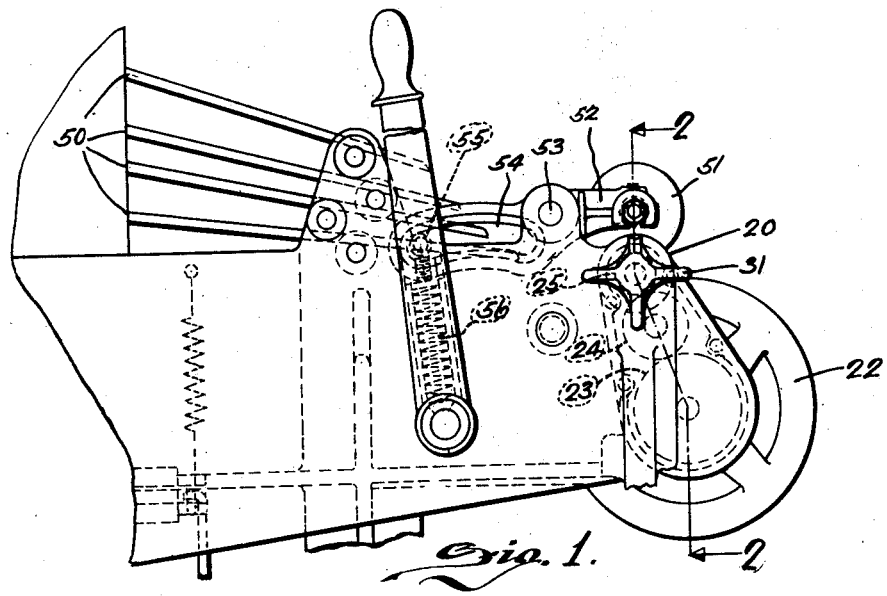
Fig. 1 is a fragmentary side elevation of a condenser winding machine provided with an embodiment of the present invention.

The condenser winding machine comprises a frame 20 supporting a rotatable head stock shaft or spindle 21 which is rotated by turning a hand wheel 22 geared to the shaft 21 by meshing gears 23, 24 and 25. The frame 20 also supports a tubular tail stock member or spindle 30 provided with a handle 31 and providing a plain bearing 32 and a ball bearing 33 for a tail stock spindle 34. The spindle 34 has a head 35 carrying a projecting ear 36 to which a rivet 37 pivotally secures two arbor members or bars 38. Each arbor member has a cross sectional shape which is the segment of a circle, and these arbor members are spaced apart a distance equal to the thickness of the ear 36. The ends of the arbor members remote from the tail stock are somewhat conically tapered at 39 and are adapted to be received by similarly shaped notches 40 in a head 41 carried by the shaft 21. These notches 40 are separated by a wedge-shaped projection 42 which is engaged by similarly shaped surfaces provided by the facing sides of the free ends of the arbor members 38.

Figure 2:
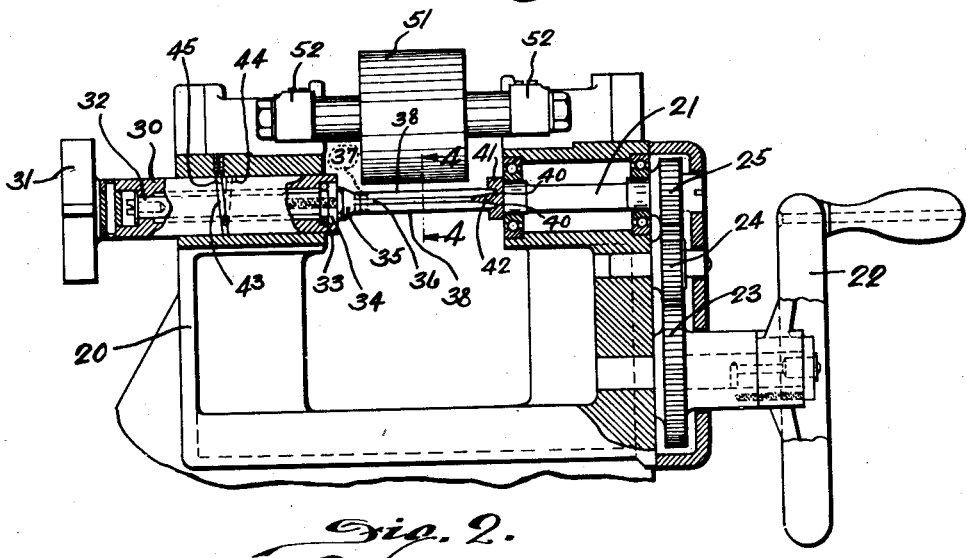
Fig. 2 is a front view partly in section the section being taken on line 2—2 of Fig. 1.
Figures 3, 4:
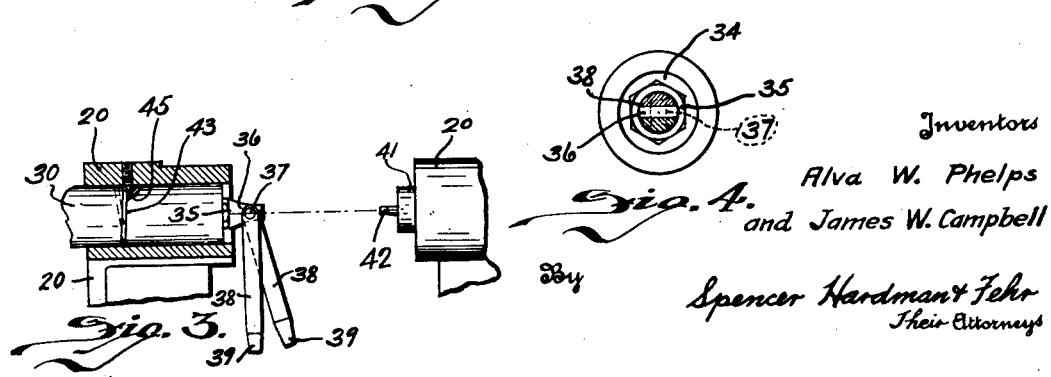
Fig. 3 is a fragmentary view partly in section showing the winding arbor in collapsed condition.
Fig. 4 is an enlarged sectional view taken on the line 4—4 of Fig. 2.

The tail stock supporting member 30 is movable axially with respect to the head stock shaft 21. The tail stock 30 is provided with a helical groove 43 connecting with a longitudinal notch 44. Both the groove and notch receive the end of a screw pin 45 fixed to the frame 20. The collapsed position of the arbor members 38 is shown in Fig. 3. Before beginning a winding operation, the operator locates the arbor members 38 so that the tapered end portions are in alignment with the notches 40 of the head stock 41. Then the tail stock holder 30 is moved endwise until the pin 45 is located in one end of the helical groove 43. Then the tail stock holder 30 is turned so that it will be caused to move toward the head stock 41 due to the cooperation between the pin 45 and the side wall of the groove 43. The coaction between these parts causes the tapered ends of the arbor members 38 to be wedged securely in the notches 40 of the head stock 41 and to be held in this position until the operator turns the handle 31 in a direction to relieve the wedge pressure, and while held in this position the bars are expanded by the projection 42. The notches 40 and the wedge shaped projection 42 of the head stock 41 are so shaped and located, that when the arbor members 38 are located in position for winding, as shown in Fig. 2, the cylindrical surfaces of the arbor members or bars 38 will both in fact be concentric with the axis of the tail stock spindle 34 and the head stock shaft 21.

The materials to be wound upon the arbor members 38 are guided into position by chutes 50 and the ends of these strips of material are held against the arbor members 38 while turning the handle in order to wind this material upon the arbor members. In order to remove wrinkles in the material and to lightly wind this material upon the arbor members a pressure roller 51 is employed. This roller is journalled by suitable bearings carried by levers 52 pivoted at 53 and provided with a slot 54 which receives a block 55 pressed upwardly by a spring 56. Further details of the construction of the condenser winding machine to which the present invention may be applied are disclosed in the patent of F. C. Kroeger et al., No. 1,641,389.

After the material has been wound upon the arbor members 38 the tail stock spindle 34 is retracted by turning the member 30 in the opposite direction, so as to permit withdrawing the arbor members from the notches 40 of the head stock 41. Since these arbor members 38 are made of relatively flexible metal the free ends may approach each other so as to permit removal of the cylinder of material wound upon them. The arbor members 38 may be rather loosely pivoted upon the rivet 37 so as to permit collapsing of the arbor members when disengaged from the head stock 41.

While the form of embodiment of the present invention as herein disclosed, constitutes a preferred form, it is to be understood that other forms might be adopted, all coming within the scope of the claims which follow.

What is claimed is as follows:

1. In a machine for winding materials, the combination comprising a driven and a driving spindle, both spindles being coaxially aligned and one of them being movable axially and the axially movable spindle having a lug; two bars of flexible metal together forming part of a mandrel, said bars being pivoted at one end to the lug of the axially movable spindle, the pivot axes of both bars being coaxial and the bars being spaced apart by said lug which is interposed between the pivotally supported ends of the bars whereby the latter are substantially kept apart; and means for drivingly connecting the free ends of the bars with the axially stationary spindle whereby the bars act as driving members between both spindles.

2. In a machine for winding materials, the combination comprising a driven and a driving spindle, both spindles being coaxially aligned and the driven spindle being movable axially and having a lug; two bars of flexible metal together forming part of a mandrel, said bars being pivoted at one end to the lug of the driven spindle, the pivot axes of both bars being coaxial and the bars being spaced apart by said lug which is interposed between the pivotally supported ends of the bars whereby the latter are substantially kept apart; and means for drivingly connecting the free ends of the bars with the driving spindle whereby the other spindle is driven by said bars.

3. In a machine for winding materials, the combination comprising stationary bearings; a driven and a driving spindle, both spindles being coaxially aligned and rotatably supported in the stationary bearings, the driven spindle being movable axially in its bearing and having a lug; two bars of flexible metal together forming part of a mandrel, said bars being pivoted at one end to the lug of the driven spindle, the pivot axes of both bars being coaxial and the bars being spaced apart by said lug which is interposed between the pivotally supported ends of the bars whereby the latter are substantially kept apart; means carried by the driving spindle for drivingly connecting the free ends of the bars with said driving spindle upon movement of the bars and driven spindle toward said connecting means whereby the driven spindle is driven by said bars; and a bayonet connection between the driven spindle and its supporting bearing.

4. In a machine for winding materials, the combination comprising a driven and a driving spindle, both spindles being coaxially aligned, one of the spindles being movable axially and one of the spindles having a lug; two bars of flexible metal together forming part of a mandrel, said bars being pivoted at one end to the lug and the pivot axes of both bars being coaxial, said bars being spaced apart by said lug which is interposed between the pivotally supported ends of the bars whereby the latter are substantially kept apart; and means for drivingly connecting the free ends of the bars with the adjacent spindle whereby the bars act as driving members between both spindles.

5. In a machine for winding materials, the combination comprising a driven and a driving spindle, both spindles being coaxially aligned, the driven spindle having a lug and one of the spindles being movable axially; two bars of flexible metal together forming part of a mandrel, said bars being pivoted at one end to the lug of the driven spindle, the pivot axes of both bars being coaxial and the bars being spaced apart by said lug which is interposed between the pivotally supported ends of the bars whereby the latter are substantially kept apart; and means for drivingly connecting the free ends of the bars with the driving spindle whereby the other spindle is driven by said bars.

ALVA W. PHELPS.
JAMES W. CAMPBELL.